Feb. 15, 1927.
J. L. HUTCHINGS
REPAIR TOOL
Filed June 6, 1925
1,617,812
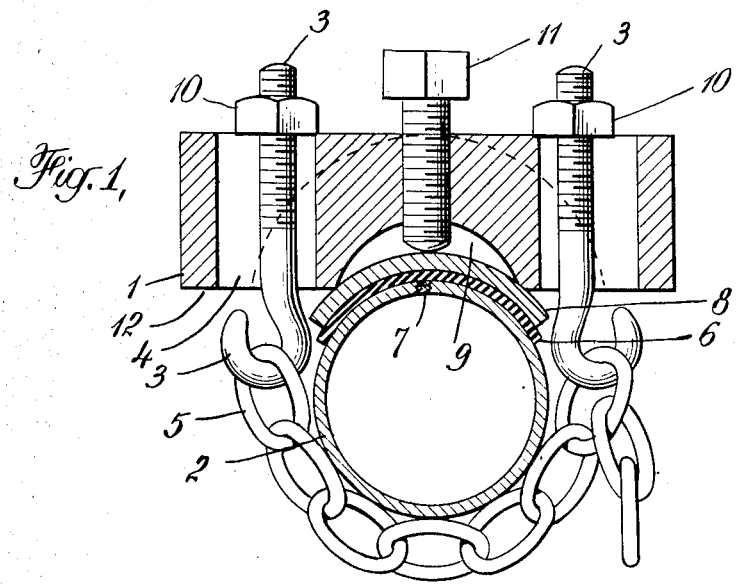
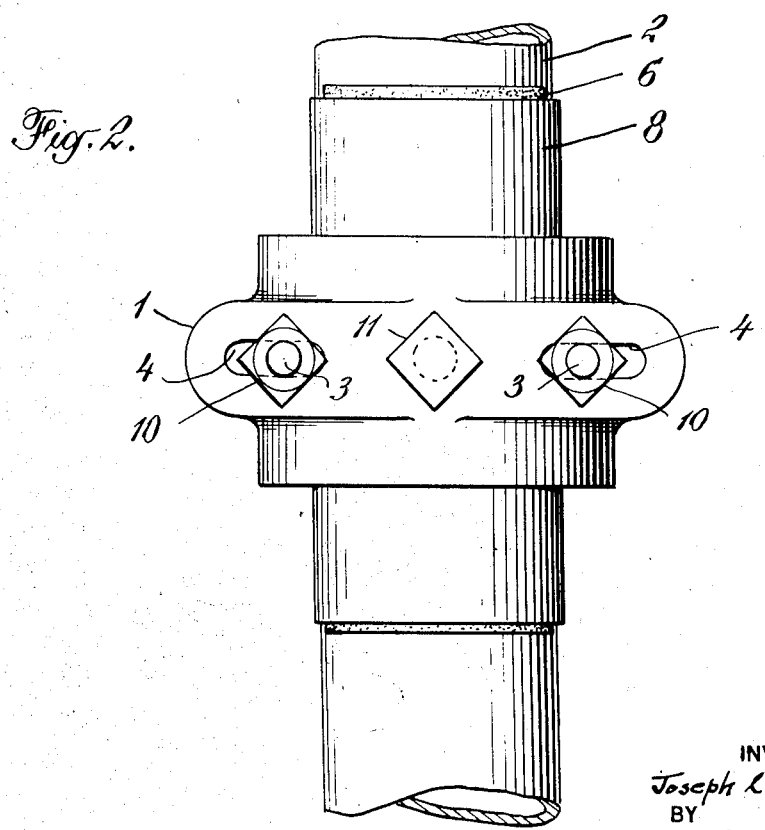
INVENTOR
Joseph L. Hutchings
BY
Pennie, Davis, Marvin, + Edmonds
ATTORNEYS Patented Feb. 15, 1927.

1,617,812

UNITED STATES PATENT OFFICE.

JOSEPH L. HUTCHINGS, OF OLEAN, NEW YORK.

REPAIR TOOL.

Application filed June 6, 1925. Serial No. 35,500.

This invention relates to an improved repair tool of simple and inexpensive construction adapted more particularly for repairing leaking pipes of variable sizes. It may be quickly and easily applied to effectively stop any such leaks in pipes of practically any size. The tool may be used also for repairing flat surfaces.

Pipe repair devices are usually designed for particular sized pipes; and a special tool must be used for pipes of different sizes. The inconvenience of first determining the size of the pipe which has sprung a leak and then selecting the proper sized repair tool is evident. If no tool of the proper size is available, the workman must necessarily devise some make-shift. Likewise, if some flat object has sprung a leak, a special repair tool is required.

It is the object of this invention to provide a tool of substantially universal application with which the workman is enabled to make the required repair at a moment's notice. It will very readily adapt itself to any pipe from 1" in diameter on up. Furthermore, I can also use this same tool for repairing flat objects that have sprung a leak.

The tool comprises a saddle, designed to fit over the pipe which is to be repaired, with a flexible member, such as a chain, attached to both ends of the saddle by means of bolts inserted in suitable holes in the saddle. The chain and saddle can be tightly drawn about the pipe. The saddle has a concave surface which can rest on curved surfaces of varying diameters and a portion of the lower surface of the saddle is also flat. This flat surface is to be used when repairing flat objects. The saddle also has a threaded hole running down through the center into which a set screw is fitted for applying additional pressure. The bolt holes in the saddle are preferably elongated slots so that the bolts can be adjusted to allow the chain to fit more snugly about the pipe. This facilitates the use of the tool with pipes of varying diameters. The bolts have hooks at their ends to fit into the links of the chain extending around the pipe, thus affording a simple arrangement for shortening or lengthening the chain.

In applying the tool to stop a leak, a piece of gasket, rubber, or some such resilient material, is placed upon the crack or opening in the pipe. A curved metallic plate is then placed upon the resilient gasket and the saddle is rested upon the metallic plate. The chain is then hooked onto one of the bolts, extended around the pipe and there hooked onto the other bolt. A wrench is then employed to tighten the bolts. The leak can very often be stopped by a sufficient number of turns of the nuts on these bolts. However, if any additional pressure is required to more effectively seal the leak, the set screw can be turned.

In case the leak is located on the under-side of the pipe, and it is inconvenient to place the saddle on the under-side of the pipe, the saddle may be allowed to rest on the upper side of the pipe and the flexible member is then brought around the pipe and hooked onto the bolts, as above described, but, instead of using the gasket and metallic plate directly underneath the saddle, these two repair parts may be placed on the lower side of the pipe over the leak in such way that the flexible member will bear on them and effectively stop the leak, as the bolts in the saddle are tightly turned. Additional pressure may be obtained by screwing down the set-screw. Hence, it will be seen that this tool is adapted to be used in any position about the pipe.

In the case of a flat object, a gasket, or the like, is put over the leak, a metallic plate is put on the gasket, and the saddle is allowed to rest on the plate. In such a situation, the chain and the special bolts are dispensed with and ordinary bolts are substituted therefor. These are inserted in the holes in the saddle and then screwed into the object to be repaired, wherever, the flat object will lend itself to the tapping of holes for such purpose. If the bolts are not sufficient to completely tighten the saddle on the metallic plate, use may be made of the set-screw as before.

The preferred form of the invention is illustrated in the accompanying drawing, in which:

Fig. 1 is a cross-sectional view of the repair tool showing its application to a pipe which is to be repaired.

Fig. 2 is a plan view of the structure as shown in Fig. 1.

The saddle 1 which may be made of any suitable material, preferably of metal, is placed in position about the pipe 2. The bolts 3 are inserted in the saddle holes 4, and the flexible member 5, which is preferably a chain made up of metallic links adapted to be fitted over the hooks on the bolts 3, is tightly drawn about pipe 2 which is to be repaired. A resilient plate 6, which may be of any suitable flexible material, such as rubber gasket, or the like, is placed over the crack 7 in the pipe 2, which has sprung a leak. A metallic pressure plate 8, which is preferably curved, is placed over the resilient plate 6. The saddle 1 is allowed to rest upon the metallic plate 8 in such way that the curved portion 9 of the saddle fits directly over this curved plate. The links in the chain 5 are drawn tightly about the pipe 2 in such way as to take up all the slack possible. The tool is now is position to be drawn tightly about the pipe. This tightening is accomplished by turning the nuts 10 of the bolts 3 so that the saddle is made to bear tightly on the metallic plate 8. The holes in the saddle 4 are preferably slotted so that the bolts 3 may be moved inwardly, outwardly, or inclined at an angle best suited for the maximum contact of the flexible member 5 about the outside surface of the pipe 2. In this manner, the saddle is more readily suited for repair purposes on practically any sized pipe; that is to say, pipes of varying diameters. In case the leak cannot be effectively stopped by drawing up on the bolts 3, the set-screw 11 in the saddle 1 provides additional pressure to force the metallic plate upon the resilient plate 6, which is located over the leak 7.

The saddle 1 is so designed that it can be used as a repair tool for flat objects. It has a flat surface 12 on the bottom at both ends which is designed to fit upon the flat object to be repaired. The hooked bolts and the chain are dispensed with, and ordinary bolts are substituted therefor. The flat object to be repaired will have holes tapped therein located at such a distance apart that the bolts inserted in the holes 4 of the saddle member may be screwed down into these tapped holes and the saddle member 1 may thus be tightly pressed upon a metallic pressure plate, which is not curved in this instance, upon the resilient plate resting over the leaking crack. If it is not possible to secure sufficient pressure of the saddle on the metallic plate by means of the bolts, the set-screw can again be used as before. In this manner, the leak can be effectively stopped.

Various changes can be made in the details of construction of the tool as described without departing from the invention or sacrificing any of the advantages thereof.

I claim:

1. In a repair tool, the combination of a saddle, a pressure plate cooperating therewith and means for adjustably securing the saddle to the article to be repaired and simultaneously applying pressure to the pressure plate, including a flexible member adapted to embrace the article and adjustable bolts connected to the flexible member and to the saddle.

2. In a repair tool, the combination of a saddle, a pressure plate cooperating therewith and means for adjustably securing the saddle to the article to be repaired and simultaneously applying pressure to the pressure plate, including a flexible member adapted to embrace the article and adjustable bolts connected to the flexible member and to the saddle, and auxiliary means for increasing the pressure on the pressure plate.

In testimony whereof I affix my signature.

JOSEPH L. HUTCHINGS.